US007161713B2

(12) United States Patent
Kumada et al.

(10) Patent No.: US 7,161,713 B2
(45) Date of Patent: Jan. 9, 2007

(54) EVALUATION APPARATUS, EVALUATION METHOD, STORAGE MEDIUM STORING PROGRAM, AND PROGRAM, FOR EVALUATING COLOR REPRODUCIBILITY

(75) Inventors: Shuichi Kumada, Kanagawa (JP); Yasushi Nakajima, Kanagawa (JP); Ayako Sano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1025 days.

(21) Appl. No.: 10/178,352

(22) Filed: Jun. 25, 2002

(65) Prior Publication Data

US 2003/0046019 A1 Mar. 6, 2003

(30) Foreign Application Priority Data

Jun. 28, 2001 (JP) ............................. 2001-197284

(51) Int. Cl.
| | |
|---|---|
| G06K 1/00 | (2006.01) |
| G06K 9/00 | (2006.01) |
| G09G 5/10 | (2006.01) |
| G09G 5/02 | (2006.01) |
| G06F 17/00 | (2006.01) |

(52) U.S. Cl. ..................... 358/1.9; 382/162; 382/168; 345/204; 345/589; 345/690

(58) Field of Classification Search ................. 358/1.9, 358/501, 502, 504, 515, 518–520, 523; 702/127; 347/19, 115, 172, 188; 399/72; 382/162, 382/168; 345/204, 418, 589, 690
See application file for complete search history.

(56) References Cited

U.S. PATENT DOCUMENTS 5,877,787 A * 3/1999 Edge ........................... 347/19

FOREIGN PATENT DOCUMENTS

JP 09-218956 8/1997

* cited by examiner

*Primary Examiner*—Kimberly Williams
*Assistant Examiner*—Charlotte M. Baker
(74) *Attorney, Agent, or Firm*—Fitzpatrick, Cella, Harper & Scinto

(57) ABSTRACT

When a color-reproducibility precision is determined with a plurality of evaluation colors, an overall color-reproducibility precision needs to be obtained with the plurality of evaluation colors to evaluate color reproducibility with a high precision. A color-evaluation-scale calculation section calculates color differences and metrics from the input colorimetric values of a reference image and the input colorimetric values of an image to be evaluated, for a plurality of evaluation colors, and computes a plurality of color-evaluation scales indicating a color-reproducibility precision of the image to be evaluated, according to the calculated color differences and metrics.

4 Claims, 17 Drawing Sheets

| ΔEct | | FREQUENCY | % | AVERAGE | STANDARD DEVIATION | Max | Min |
|---|---|---|---|---|---|---|---|
| > | <= | 928 | 100.0 | 2.79 | 2.31 | 16.95 | 0.00 |
| 0 | 1 | 117 | 12.6 | | | | |
| 1 | 2 | 293 | 31.6 | | | | |
| 2 | 3 | 263 | 28.3 | | | | |
| 3 | 4 | 103 | 11.1 | | | | |
| 4 | 5 | 48 | 5.2 | | | | |
| 5 | 6 | 25 | 2.7 | | | | |
| 6 | 7 | 18 | 1.9 | | | | |
| 7 | 8 | 20 | 2.2 | | | | |
| 8 | 9 | 8 | 0.9 | | | | |
| 9 | 10 | 12 | 1.3 | | | | |
| 10 | 11 | 2 | 0.2 | | | | |
| 11 | 12 | 9 | 1.0 | | | | |
| 12 | 13 | 6 | 0.6 | | | | |
| 13 | 14 | 0 | 0.0 | | | | |
| 14 | 15 | 0 | 0.0 | | | | |
| 15 | 16 | 3 | 0.3 | | | | |
| 16 | 17 | 1 | 0.1 | | | | |
| 17 | 18 | 0 | 0.0 | | | | |
| 18 | 19 | 0 | 0.0 | | | | |
| 19 | 100 | 0 | 0.0 | | | | |

| ΔL | > | <= | FREQUENCY | % | AVERAGE | STANDARD DEVIATION | Max | Min |
|---|---|---|---|---|---|---|---|---|
| 1 | | | 928 | 100.0 | 1.71 | 2.73 | 16.32 | -3.04 |
| 2 | -100 | -8 | 0 | 0.0 | | | | |
| 3 | -8 | -6 | 0 | 0.0 | | | | |
| 4 | -6 | -4 | 0 | 0.0 | | | | |
| 5 | -4 | -2 | 14 | 1.5 | | | | |
| 6 | -2 | 0 | 225 | 24.2 | | | | |
| 7 | 0 | 2 | 380 | 40.9 | | | | |
| 8 | 2 | 4 | 180 | 19.4 | | | | |
| 9 | 4 | 6 | 57 | 6.1 | | | | |
| 10 | 6 | 8 | 38 | 3.9 | | | | |
| | 8 | 100 | 36 | 3.9 | | | | |

FIG. 5B

| ΔC | > | <= | FREQUENCY | % | AVERAGE | STANDARD DEVIATION | Max | Min |
|---|---|---|---|---|---|---|---|---|
| 1 | | | 928 | 100.0 | -0.57 | 2.06 | 5.96 | -7.31 |
| 2 | -100 | -8 | 0 | 0.0 | | | | |
| 3 | -8 | -6 | 12 | 1.3 | | | | |
| 4 | -6 | -4 | 31 | 3.3 | | | | |
| 5 | -4 | -2 | 158 | 17.0 | | | | |
| 6 | -2 | 0 | 372 | 40.1 | | | | |
| 7 | 0 | 2 | 208 | 28.8 | | | | |
| 8 | 2 | 4 | 74 | 8.0 | | | | |
| 9 | 4 | 6 | 13 | 1.4 | | | | |
| 10 | 6 | 8 | 0 | 0.0 | | | | |
| | 8 | 100 | 0 | 0.0 | | | | |

FIG. 5C

| ΔH | > | <= | FREQUENCY | % | AVERAGE | STANDARD DEVIATION | Max | Min |
|---|---|---|---|---|---|---|---|---|
| 1 | | | 928 | 100.0 | -0.32 | 1.83 | 4.55 | -6.03 |
| 2 | -100 | -8 | 0 | 0.0 | | | | |
| 3 | -8 | -6 | 1 | 0.1 | | | | |
| 4 | -6 | -4 | 41 | 4.4 | | | | |
| 5 | -4 | -2 | 121 | 13.0 | | | | |
| 6 | -2 | 0 | 330 | 35.6 | | | | |
| 7 | 0 | 2 | 301 | 38.9 | | | | |
| 8 | 2 | 4 | 72 | 7.8 | | | | |
| 9 | 4 | 6 | 2 | 0.2 | | | | |
| 10 | 6 | 8 | 0 | 0.0 | | | | |
| | 8 | 100 | 0 | 0.0 | | | | |

| No | File | Loc | C | M | Y | K | Color | ΔEch | ΔL | ΔC | ΔH |
|---|---|---|---|---|---|---|---|---|---|---|---|
| 19 | S7 | 0B06 | 0 | 100 | 0 | 100 | | 16.95 | 16.32 | -5.52 | -4.65 |
| 23 | S7 | 0B10 | 0 | 100 | 100 | 100 | | 15.79 | 15.40 | -6.08 | -2.07 |
| 22 | S7 | 0B09 | 100 | 0 | 100 | 100 | | 15.74 | 15.26 | -7.20 | 1.10 |
| 21 | S7 | 0B08 | 100 | 100 | 0 | 100 | | 15.49 | 15.47 | -0.27 | 1.00 |
| 872 | S10 | 23B04 | 40 | 100 | 0 | 80 | | 12.94 | 12.66 | 0.70 | -4.02 |
| 858 | S10 | 23A04 | 0 | 100 | 0 | 80 | | 12.94 | 12.68 | -0.17 | -4.12 |
| 18 | S7 | 0B05 | 100 | 0 | 0 | 100 | | 12.58 | 11.67 | -7.31 | 1.46 |
| 892 | S10 | 24C04 | 70 | 100 | 40 | 80 | | 12.29 | 11.89 | -1.69 | -4.00 |
| 884 | S10 | 24A04 | 0 | 100 | 40 | 80 | | 12.25 | 12.07 | -2.38 | -2.99 |
| 888 | S10 | 24B04 | 40 | 100 | 40 | 80 | | 12.12 | 11.77 | -3.81 | -3.47 |
| 175 | S8 | 0N06 | 0 | 100 | 0 | 70 | | 11.77 | 11.39 | 3.48 | -4.51 |
| 904 | S10 | 25B04 | 40 | 100 | 70 | 80 | | 11.63 | 11.35 | -5.46 | -1.08 |
| 896 | S10 | 24D04 | 100 | 100 | 40 | 80 | | 11.50 | 11.37 | -1.53 | 1.92 |
| 880 | S10 | 23D04 | 100 | 100 | 0 | 80 | | 11.49 | 11.22 | 3.06 | 2.76 |
| 876 | S10 | 23C04 | 70 | 100 | 0 | 80 | | 11.44 | 11.00 | 1.68 | -4.37 |
| 916 | S10 | 26A04 | 0 | 100 | 100 | 80 | | 11.36 | 10.90 | -5.38 | -4.00 |
| 177 | S8 | 0N08 | 100 | 100 | 0 | 70 | | 11.30 | 10.98 | 4.82 | 2.36 |
| 900 | S10 | 25A04 | 0 | 100 | 70 | 80 | | 11.26 | 11.08 | -3.51 | -2.23 |
| 24 | S7 | 0B11 | 100 | 100 | 100 | 100 | | 11.01 | 11.00 | -0.16 | -0.51 |
| 920 | S10 | 26B04 | 40 | 100 | 100 | 80 | | 10.81 | 10.29 | -6.10 | -2.73 |
| 926 | S10 | 26D02 | 100 | 40 | 100 | 80 | | 10.31 | 9.92 | -5.94 | 1.37 |

FIG. 7

THIRD LAYER

FOURTH LAYER

SCORE TABLE

| No | C | M | Y | K | DE | DL | DC | DH |
|----|----|----|----|----|-----|-----|-----|-----|
| 1 | 80 | 65 | 65 | 0 | 3.5 | -0.7 | 3.9 | -1.0 |
| 2 | 0 | 60 | 0 | 0 | 4.5 | -2.7 | 2.5 | 2.0 |
| 3 | 0 | 40 | 40 | 70 | 1.2 | -5.7 | 2.9 | -1.3 |
| ⋮ | ⋮ | | | | ⋮ | | | |
| N | | | | | | | | |

FIFTH LAYER

FIG. 14E

EVALUATION APPARATUS, EVALUATION METHOD, STORAGE MEDIUM STORING PROGRAM, AND PROGRAM, FOR EVALUATING COLOR REPRODUCIBILITY

BACKGROUND OF THE INVENTION

1. Field of the Invention

The present invention relates to evaluation apparatuses, evaluation methods, storage media which store programs, and programs, for evaluating color reproducibility.

2. Description of the Related Art

In methods for objectively evaluating the color reproducibility of image processing apparatuses or display/recording apparatuses which perform color matching, colors of an image to be evaluated are first measured with a colorimeter, such as a spectrocolorimeter, which can measure colors with high precision. The measured color values (colorimetric values) obtained from the calorimeter, such as $CIEL*a*b*$, are then compared with the color values of a reference image or a suitable color-reproducibility image to obtain color differences, $CIE\Delta E*ab$, of the measured color values of the evaluated image. Color reproducibility is evaluated by the magnitudes of the color differences.

To accurately evaluate the color reproducibility of an apparatus which executes color matching, it is necessary to use as many evaluation colors as possible. Standard color separation data in four-color offset printing, for example, ISO 12642 (1996) specifies 928 evaluation colors. When so many evaluation colors are used to evaluate color reproducibility, it is necessary to perform comparison for evaluation scales, such as a color difference, separately for each evaluation color and to determine the level. This is a complicated and troublesome process.

A general color-reproducibility evaluation method, disclosed in Japanese Unexamined Patent Application Publication No. Hei-9-218956, uses the color difference $\Delta E*ab$ (ave)RMS of $CIEL*a*b*$ for the average color-shift amount for ideal color reproduction. The average color difference $\Delta E*ab(ave)RMS$ indicates, however, just one part of the characteristics of color reproducibility for many evaluation colors.

There is, for example, a technology disclosed in "Color Management System Evaluation Reference" written by Alfons Ritzeretal, Cohan Technology R&D Laboratory that uses many evaluation scales. This technology is known as a method for synthetically handling many evaluation colors. This technology statistically expresses color differences $\Delta E*ab$ for each of the 928 evaluation colors, described in ISO 12642 (1996), by the average $\Delta E*ab(ave)$, standard deviation $\Delta E*ab(\sigma)$, and maximum value $\Delta E*ab(max)$. Even when three variates (the average, the standard deviation, and the maximum value) are used to express a multivariate evaluation scale for a plurality of evaluation colors, it is still difficult to intuitively understand the correlation between the three variates and a subjective quality.

Some display/recording apparatuses become unstable when an external factor, such as humidity and temperature, affects the apparatuses. In this case, it is necessary to take a time-sequential evaluation into consideration. There is no report for a case in which data such as time-sequential stability is taken into account.

There is not a case either in which a plurality of evaluation scales for color reproducibility are handled and displayed in a layer manner to collectively handle an overall color-reproduction precision to the color-reproduction precision of each evaluation color.

The above-identified Japanese Unexamined Patent Application Publication, No. Hei-9-218956, discloses an example in which the result of a psychological evaluation and an evaluation scale are associated with, and describes a method for predicting an overall color-image-quality score from the relationship between the result of psychological evaluation and a plurality of evaluation scales. The patent does not describe how to obtain an allowance level. In addition, nothing has been found that describes a method in which a plurality of allowance levels are specified for each user and switched in a desired manner, nor how it is determined that the color-reproduction precision reaches an allowance level.

There is not a report either which describes a function for sorting performance in evaluation colors in an arrangement order, in a descending order (an evaluation color having a higher color-reproduction precision is listed earlier) of precision, and in an ascending order (an evaluation color having a lower color-reproduction precision is listed earlier) of precision and displaying it.

When a color-reproduction precision is determined by evaluation for a plurality of evaluation colors, the above-described technologies does not synthetically handle the color-reproduction precision with the plurality of evaluation colors, and it is difficult to perform a highly precise color-reproducibility evaluation.

Further, a plurality of evaluation scales is not accurately displayed. It is impossible to sufficiently identify a factor which causes a problem in color reproducibility. Therefore, it is difficult to optimize color-image control.

Since an allowance level is set to just one value, when each user has a different allowance level, it is difficult to sufficiently determine the extent to which the color-reproduction precision reaches the allowance level.

SUMMARY OF THE INVENTION

The present invention has been made to solve the foregoing problems individually or collectively. An object of the present invention is to accurately evaluate an overall color reproducibility with a plurality of evaluation colors.

The foregoing object is achieved in one aspect of the present invention through the provision of an evaluation apparatus for evaluating the color reproducibility of a device which processes a color image, including calculation means for calculating color differences and/or metrics from the colorimetric values of a reference image and the colorimetric values of an image to be evaluated, for a plurality of input evaluation colors; and computation means for computing a plurality of color-evaluation scales indicating the color-reproduction precision of the image to be evaluated, according to the calculated color differences and/or metrics.

The evaluation apparatus may include determination means for comparing an allowance area for each user obtained as a psychological and physical quantity from the correlation between the request level of the user and the plurality of color-evaluation scales, with the plurality of color-evaluation scales computed by the computation means to determine an extent to which the color-reproduction precision reaches the allowance level of a specified user.

The evaluation apparatus may further include generation means for generating display data used for displaying the plurality of color-evaluation scales.

The foregoing object is achieved in another aspect of the present invention through the provision of an evaluation method for evaluating the color reproducibility of a device which processes a color image, including calculating color differences and/or metrics from the colorimetric values of a reference image and the colorimetric values of an image to be evaluated, for a plurality of input evaluation colors; and computing a plurality of color-evaluation scales indicating the color-reproduction precision of the image to be evaluated, according to the calculated color differences and/or metrics.

The foregoing object is achieved in yet another aspect of the present invention through the provision of a storage medium storing a program for evaluating the color reproducibility of a device which processes a color image, including a code for calculating color differences and/or metrics from the colorimetric values of a reference image and the colorimetric values of an image to be evaluated, for a plurality of input evaluation colors; and a code for computing a plurality of color-evaluation scales indicating the color-reproduction precision of the image to be evaluated, according to the calculated color differences and/or metrics.

The foregoing object is achieved in still another aspect of the present invention through the provision of a program for evaluating the color reproducibility of a device which processes a color image, including a code for calculating color differences and/or metrics from the colorimetric values of a reference image and the colorimetric values of an image to be evaluated, for a plurality of input evaluation colors; and a code for computing a plurality of color-evaluation scales indicating the color-reproduction precision of the image to be evaluated, according to the calculated color differences and/or metrics.

Further objects, features and advantages of the present invention will become apparent from the following description of the preferred embodiments (with reference to the attached drawings).

BRIEF DESCRIPTION OF THE DRAWINGS

FIG. 2 is a histogram showing a color-difference distribution for a plurality of evaluation colors.

FIGS. 5A to 5C are views showing metric statistics and histograms.

FIG. 7 is a view showing a calorimetric score table.

FIGS. 14A to 14E are views of each-layer display.

DESCRIPTION OF THE PREFERRED EMBODIMENTS

A color-reproducibility evaluation method and a color-reproducibility evaluation apparatus according to a preferred embodiment of the present invention will be described below by referring to the attached drawings.

[Color-reproducibility Evaluation Method]

Evaluation scales which accurately express color reproducibility, used in the present embodiment, are calculated from measured color (calorimetric) values of the reference image and those of an image to be evaluated. They are (A) a color reproduction index (CRI) and an accumulative-probability distribution graph, (B) color-difference statistics and a color-difference histogram, (C) metric statistics and a metric histogram, (D) a color-difference distribution chart and a metric distribution chart, and (E) a color-fidelity-reproduction (colorimetric) score table. Methods for obtaining these evaluation scales and their contents will be described.

Figure 1:
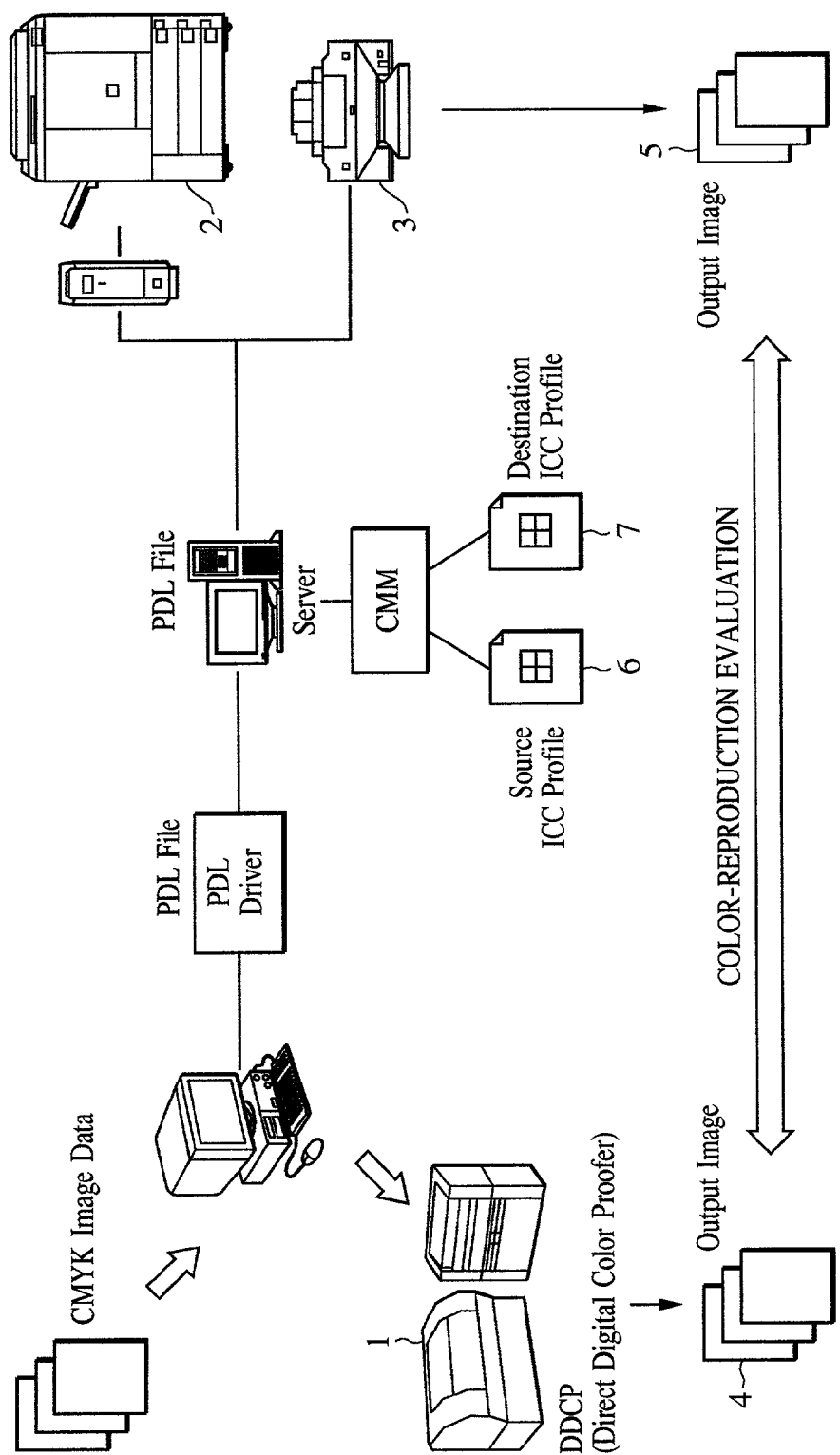
FIG. 1 is a view showing the structure of a color proof system which uses a color printer.

FIG. 1 is a view of a color proof system which uses a color printer.

In the color proof system shown in FIG. 1, instead of a flatbed proofreading machine or a direct digital color proofer (DDCP) 1, each of which is expensive and complicated, color printers (laser-beam or ink-jet printers) 2 and 3, which are inexpensive and simple, are used. ICC profiles 6 and 7 are used for color matching such that an image 5 output from a color printer and an image 4 output from the flatbed proofreading machine or the DDCP have the same tone of color, to provide the same color reproduction.

In the present embodiment, the image 4 output from the DDCP 1 is used as a reference image, and the image 5 output from the color printer 2 or 3 is used as an image to be evaluated. For convenience of description, output data of 928 evaluation colors specified by ISO 12642 (1996) will be used.

The reference image 4 and the image 5 to be evaluated are measured by the use of a spectrophotometer or a colorimeter to obtain colorimetric data of all the evaluation colors. In the present embodiment, calorimetric values in the CIE1976L*a*b* calorimetric system are used. Any calorimetric systems based on a uniform sensory space, such as the CIE1976L*u*v* colorimetric system structured in the same concept, may also be used.

A color difference and a metric are calculated for each evaluation color from the colorimetric data. A color-difference expression, a $\Delta E^*ab$ color-difference expression shown in (1), which is a Euclid distance between two points, $(L^*1, a^*1, b^*1)$ and $(L^*2, a^*2, b^*2)$ in the CIE $L^*a^*b^*$ color space, or a $\Delta E^*94$ color-difference expression shown in (2), is calculated from metrics, such as $\Delta L^*$, $\Delta C^*ab$, and $\Delta H^*ab$, with difference weights $$\Delta E^*ab = \sqrt{(\Delta L^*)^2 + (\Delta C^*ab)^2 + (\Delta H^*ab)^2} \qquad (1)$$

$$\Delta E^*94 = \sqrt{(\Delta L^*)^2 + \{\Delta C^*ab/(1+0.045C^*ab)\}^2 + \{\Delta H^*ab/(1+0.015H^*ab)\}^2} \qquad (2)$$

where, the metrics are obtained from the following expressions, $$\Delta L^* = L^*1 - L^*2$$

$$\Delta C^*ab = \sqrt{(a^*1^2 + b^*1^2)} - \sqrt{(a^*2^2 + b^*2^2)}$$

$$\Delta H^*ab = \sqrt{(\Delta E^*ab)^2 - (\Delta L^*)^2 - (\Delta C^*ab)^2}$$

A case in which the colorimetric values of one reference image is compared with the colorimetric values of N (>1) images to be evaluated to take the reproducibility (stability) of a recording apparatus into consideration will be described below.

The color-difference expressions (1) and (2) are used for calculating the color differences between the colorimetric values of the reference image 4 and the calorimetric values of one image 5 to be evaluated. To compare the colorimetric values of the reference image 4 with the colorimetric values of a plurality of images 5 to be evaluated, the expressions are modified to generate the following expressions (3) and (4), $$\Delta E^*ab(\sigma) = \sqrt{(\Delta L^*_\delta)^2 + (\Delta C^*ab_\delta)^2 + (\Delta H^*ab_\delta)^2} \quad (3)$$

$$\Delta E^*94(\sigma) = \sqrt{(\Delta L^*_\delta)^2 + \{\Delta C^*ab_\delta/(1 + 0.045C^*ave)\}^2 + \{\Delta H^*ab_\delta/(1 + 0.015H^*ave)\}^2} \quad (4)$$

where, the standard deviations of metrics are obtained by the following expressions, $$\Delta L^*_\delta = \sqrt{\sum \Delta L^*_i/(n-1)}$$

$$\Delta C^*ab_\delta = \sqrt{\sum \Delta C^*_i/(n-1)}$$

$$\Delta H^*ab_\delta = \sqrt{\sum \Delta H^*_i/(n-1)}$$

$\Delta L^*\_i$, $\Delta C^*\_i$, and $\Delta H^*\_i$ indicate metrics of the images to be evaluated, "n" indicates the total number of the images to be evaluated, and the calculation is performed for 1 to n.

The color-difference expressions (3) and (4) use the standard deviations of metrics of the images 5 to be evaluated to handle the plurality of the images 5 to be evaluated with the stability being taken into account.

Evaluation Scales for Color Reproducibility A method for calculating evaluation scales which accurately indicate color reproducibility, by using the $\Delta E^*94$ color-difference expression (including metrics) shown in (2) will be described below. Even if another color-difference expression and metrics are used, similar methods apply.

[A] CRI and Accumulative-probability Distribution Graph

A CRI is an evaluation function for indicating a color-reproduction precision for a plurality of evaluation colors by one variate.

FIG. 2 is a histogram of a color-difference distribution for a plurality of evaluation colors. In this histogram, the vertical axis indicates color-difference steps classified discretely, and the horizontal axis indicates a frequency for each color-difference step. In the present embodiment, one color difference, such as one satisfying $0 \leq \Delta E^*94 < 1$, is assigned to one color-difference step. Any value can be assigned to a color-difference step.

Figure 3:
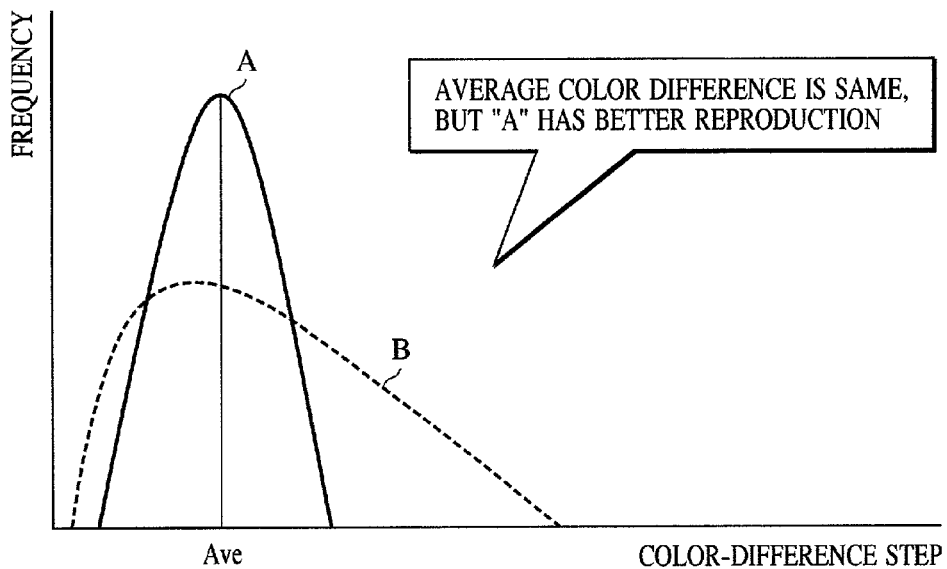
FIG. 3 is a view showing the color-difference distributions of image processing systems having different color-reproduction precisions.

FIG. 3 is a view of the color-difference distributions of image processing systems having different color-reproduction precisions. Curves A and B shown in FIG. 3 indicate that color-reproduction precisions can differ even if the average color difference, which is usually used as a scale, is identical. In other words, to define color reproducibility by a color-difference distribution for a plurality of evaluation colors, basic statistics other than the average color difference serve as important factors.

Figure 4:
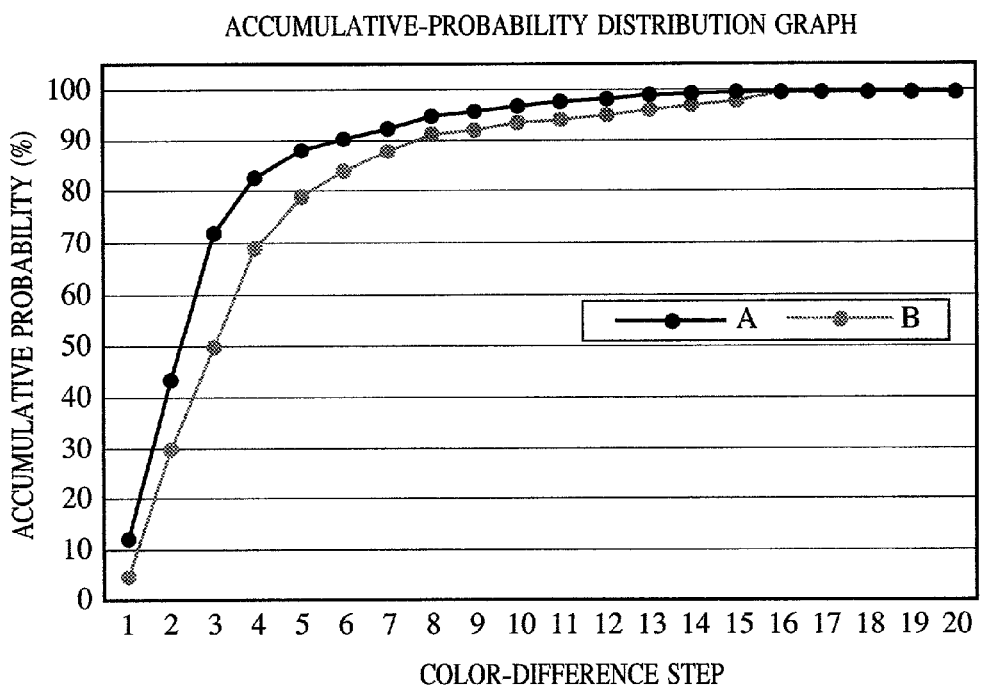
FIG. 4 is an accumulative-probability distribution graph showing the histograms of the color-difference distributions shown in FIG. 3.

FIG. 4 is a view of accumulative-probability distribution graphs which indicate the curves A and B shown in FIG. 3 correspond to the color-difference distribution histograms. In the accumulative-probability distribution graphs, the horizontal axis indicates the same color-difference step as in FIG. 3, and the vertical axis indicates an accumulative probability (%) until each color-difference step. In this case, since a curve having a higher gradient, reaching a saturation at an earlier step, and reaching 100% earlier has a higher color-reproduction precision, the curve A has a higher precision than curve B. From the characteristics of accumulative-probability distribution graphs, an evaluation function (color reproduction index) for indicating a color-reproduction precision for a plurality of evaluation colors by one variate is defined in the following expression.

$$CRI(\%) = (\Sigma \Delta Ecumulative\_i/\Sigma 100) \times 100 \quad (5)$$

where, Ecumulative_i indicates an accumulative probability (%) at a color-difference step "i," and $\Sigma$ calculation is performed for "1" to "i."

The following repeated regressive equation (6) is satisfied between the CRI(%) and basic statistics of a color-difference distribution, which shows that the evaluation function uniquely indicates a color-reproduction characteristic.

$$CRI(\%) = a \times \Delta E^*ave + b \times \Delta E^*stdeva + c \times \Delta E^*kurt + d \times \Delta E^*skew + e \quad (6)$$

where $\Delta E^*ave$, $\Delta E^*stdeva$, $\Delta E^*kurt$, and $\Delta E^*skew$ indicate the average, standard deviation, the kurtosis, and the skewness of the color-difference distribution, and "a," "b," "c," and "d" are constants.

[B] Color-difference Statistics and Color-difference Histogram

Color-difference statistics and a color-difference histogram are obtained by analyzing a color-difference distribution, which is a basis for calculating the CRI, and used for more detailed analysis. Basic statistics (color-difference statistics) of a color-difference distribution, used when the CRI is calculated, and the color-difference-distribution histogram shown in FIG. 2 are displayed. The color-difference statistics include the average, standard error, median, mode, standard deviation, variance, kurtosis, skewness, range, minimum, maximum, total, number of data items, maximum value, and minimum value in a color-difference distribution. Any statistic can be selected, calculated, and displayed.

[C] Metric Statistics and Metric Histograms

Metric statistics and metric histograms shown in FIGS. 5A to 5C are obtained by further analyzing color-difference statistics and color-difference histograms; include basic statistics (metric statistics), such as $\Delta L^*$, $\Delta C^*ab$, and $\Delta H^*$ shown in the expression (2), in metric distributions, and their histogram; and are used for more detailed analysis. The metric statistics include the average, standard error, median, mode, standard deviation, variance, kurtosis, skewness, range, minimum, maximum, total, number of data items, maximum value, and minimum value in the distributions of metrics, such as $\Delta L^*$, $\Delta C^*ab$, and $\Delta H^*$. Any metric statistic can be selected, calculated, and displayed.

[D] Color-difference and Metric Distribution Charts

Figure 6:
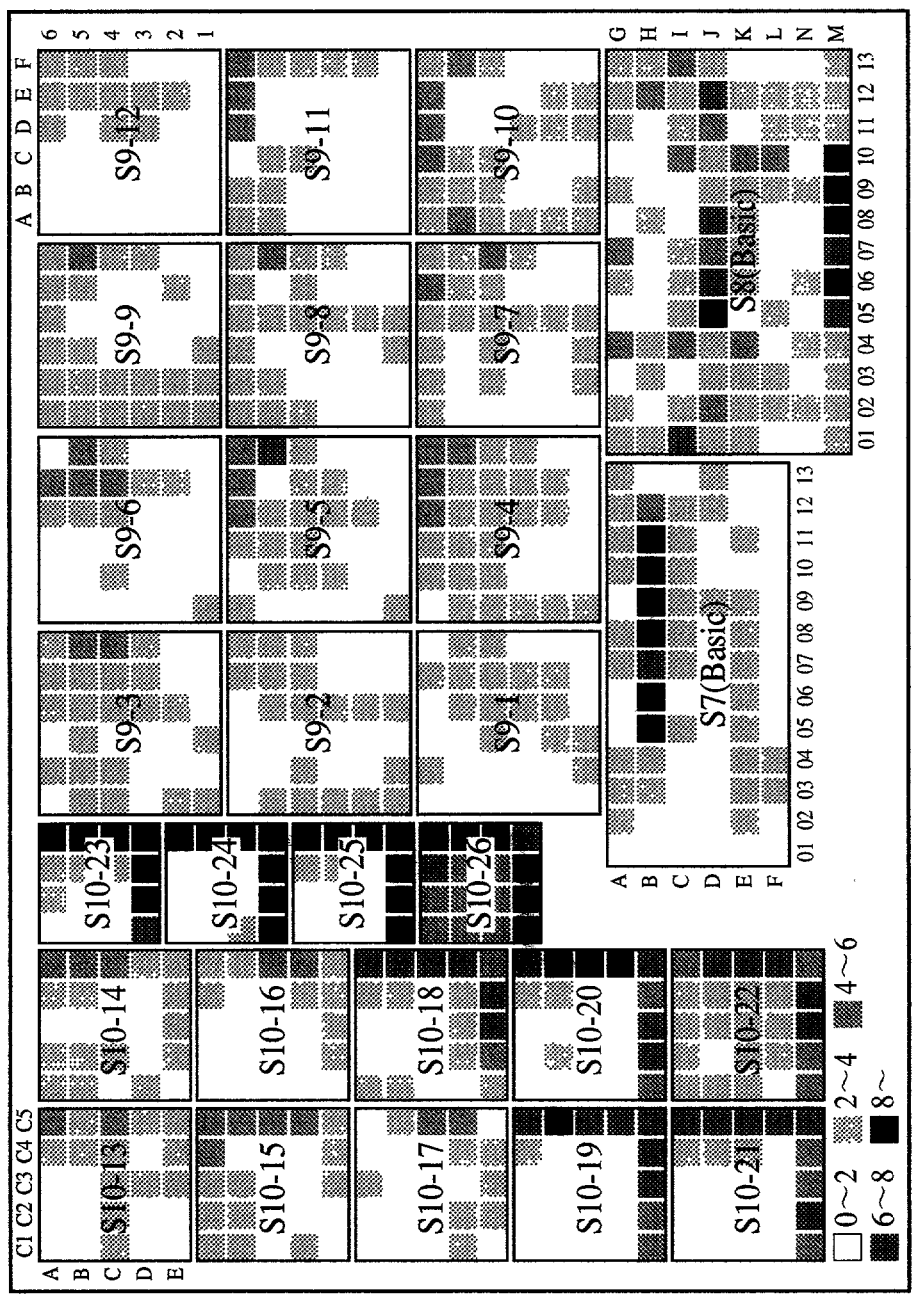
FIG. 6 is a view showing the color-difference distribution of the ISO 12642 (1996) chart.

FIG. 6 is a color-difference distribution chart specified in ISO 12642 (1996). Color-difference and metric distribution charts visually show the reproduction precision of each evaluation color in color-difference statistics and metric statistics. Color differences and metrics for each evaluation color are displayed for each color-difference step specified in advance, with colors. These charts allow detailed tendency analysis for each evaluation color.

[E] Colorimetric Score Table

FIG. 7 shows a colorimetric score table. A caolorimetric score table shows colorimetric values and color-difference/metric data used as bases for [A] to [D], for each evaluation color. Evaluation scales, such as a calorimetric value, a color difference, and metrics are listed for each evaluation color in the table. In addition, evaluation colors can be sorted and displayed for each evaluation scale in an arrangement order, an ascending order in precision, or a descending order in precision, which allows detailed precision analysis for each evaluation color.

Relationship Between CRI and Subjective Quality

The relationship between a subjective quality and a CRI, an evaluation function for accurately indicating the color reproducibility between the reference image 4 and the image 5 to be evaluated, among the foregoing evaluation scales will be described next.

Figure 8:
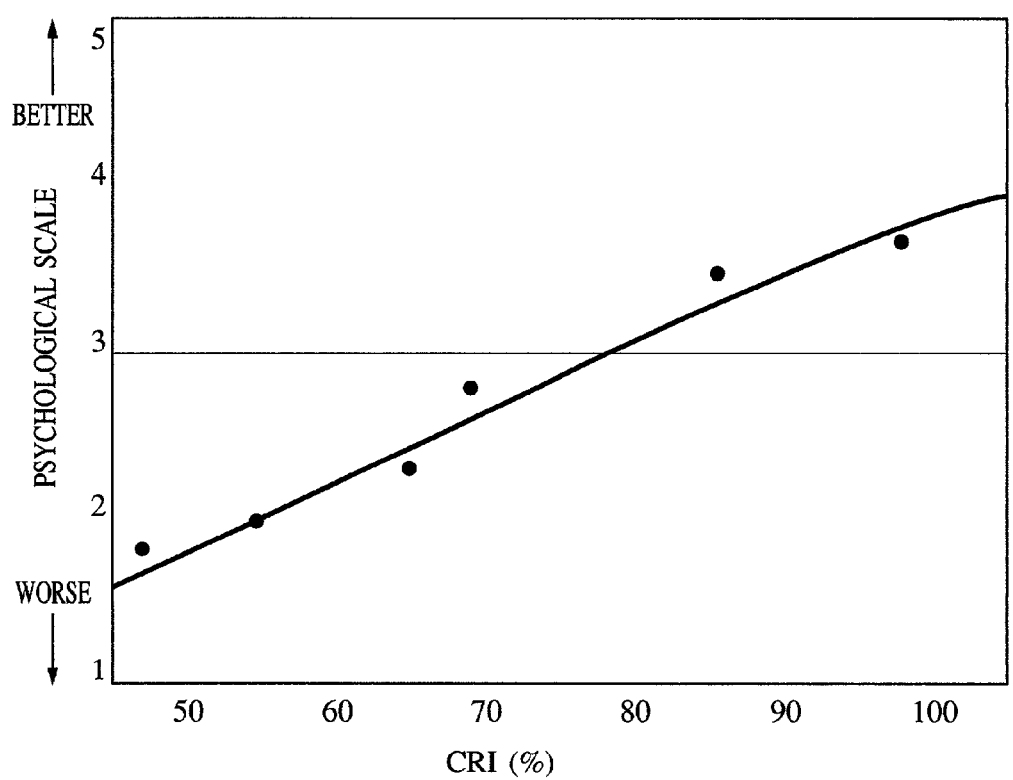
FIG. 8 is a scatter diagram of psychological quantities for a plurality of images to be evaluated having different CRIs, obtained in an experiment of a subjective evaluation method, such as a series category method.

FIG. 8 is a scatter diagram obtained in an experiment using subjective evaluation, such as a series category method, of psychological quantities (psychological scale) for a plurality of images 5 to be evaluated having different CRIs. The horizontal axis indicates CRI values, and the vertical axis indicates psychological quantities. The larger the quantity is, the more successful the color reproduction is.

It is clearly understood from the scatter diagram shown in FIG. 8 that as the CRI increases, the psychological quantity also increases, and the correlation between the CRI and the psychological scale is high. In this case, an allowance level is uniquely set to the center value of the psychological scale, but it may be set to any value. It is also known that this characteristic differs depending on users.

Figure 9:
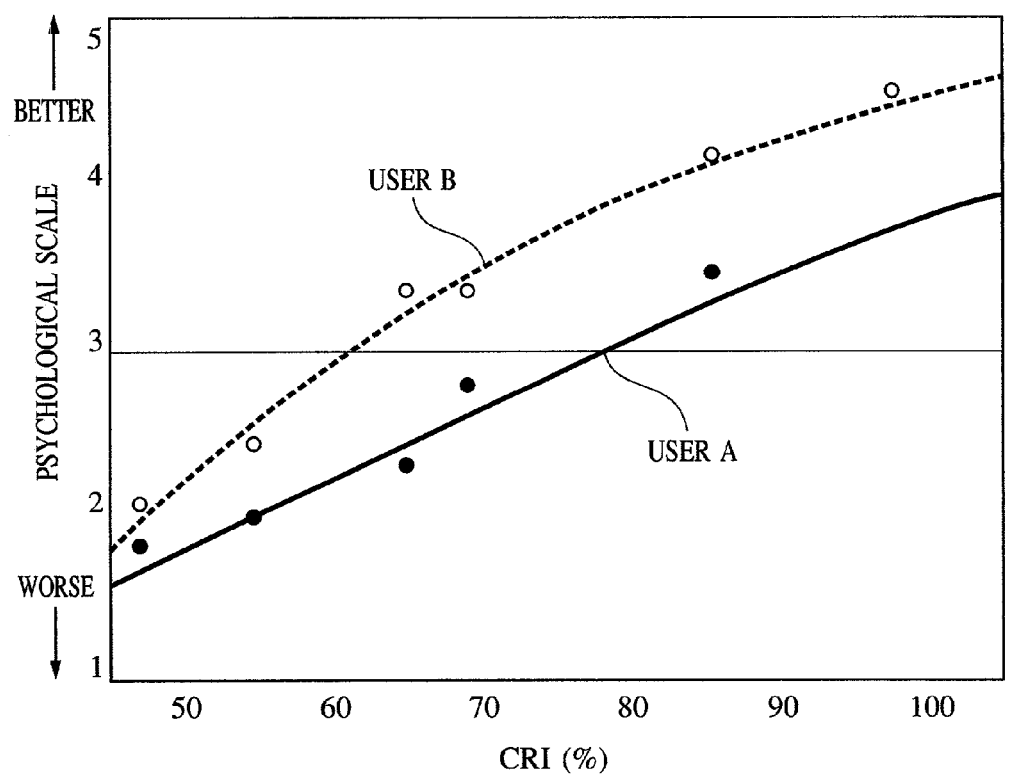
FIG. 9 is a scatter diagram of psychological quantities of users having different tendencies for the same plurality of images to be evaluated as those used for FIG. 8, obtained by a subjective evaluation experiment.

FIG. 9 is a scatter diagram obtained in an experiment using subjective evaluation, of psychological quantities of two users having different tendencies for the same images 5 to be evaluated as in FIG. 8. It is understood that a user A has a stricter determination standard for color reproducibility than a user B.

Since determination standards for color reproducibility vary depending on users in this way, it is possible that the correlation relationship between the CRI and a subjective quality is obtained for each user in advance, and the relationship characteristic is stored in a memory as a psychological, physical quantity to determine an extent to which the color-reproduction precision reaches the allowance level of a user.

[Color-reproducibility Evaluation Apparatus]

A color-reproducibility evaluation apparatus for implementing the foregoing color-reproducibility evaluation method and for determining the extent to which the color-reproduction precision reaches the allowance level of each user, according to an embodiment will be described next.

Figure 10:
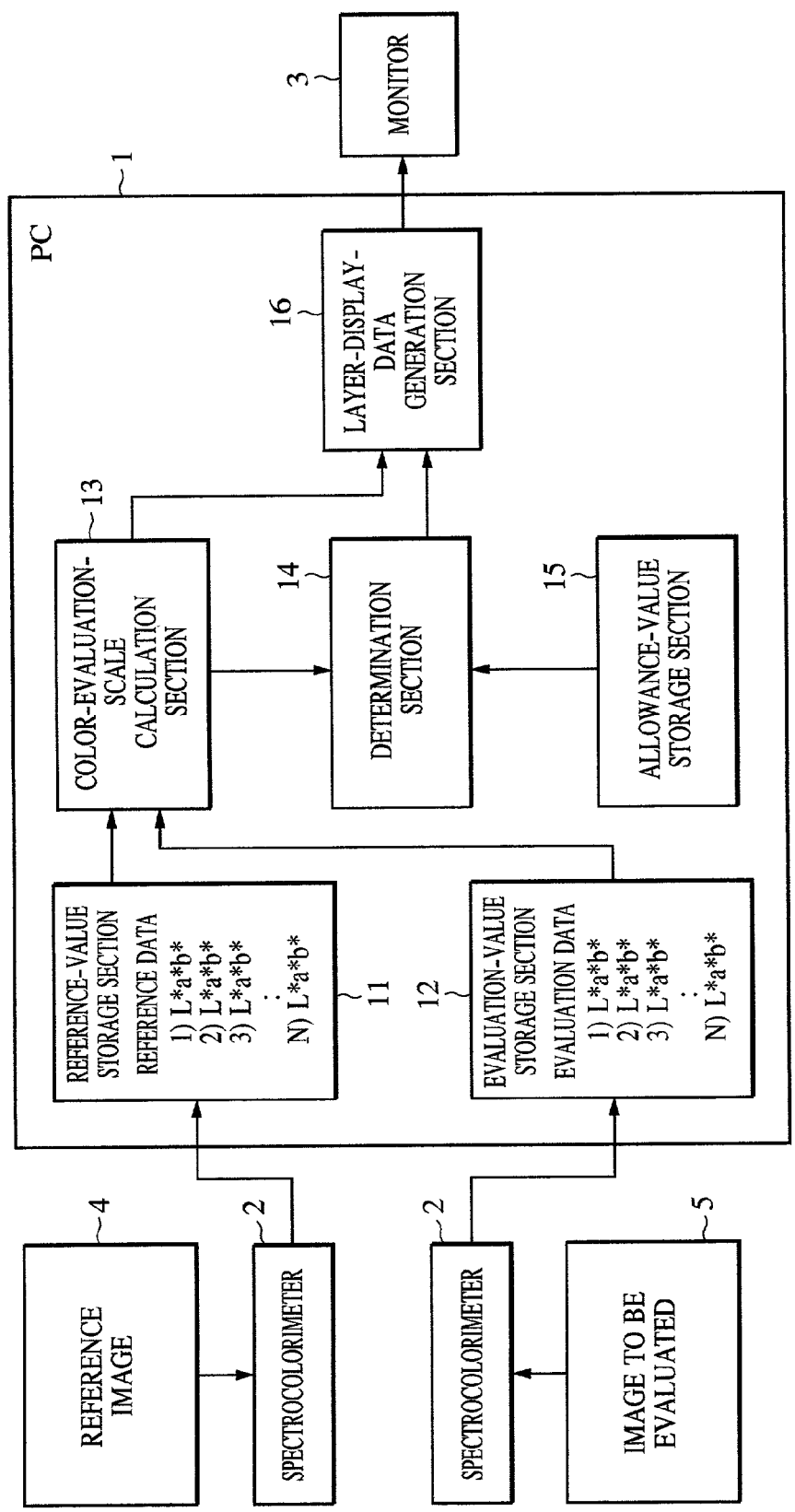
FIG. 10 is a block diagram of a color-reproduction evaluation apparatus.

FIG. 10 is a block diagram of a color-reproducibility evaluation apparatus. The present embodiment is for the color proof system described above. A reference image 4 is a calibrated printed output of DDCP 1 or others, and an image 5 to be evaluated is an output of the color printer 2 or 3.

As shown in FIG. 10, the color-reproducibility evaluation apparatus is formed of a personal computer (PC) 1, spectrocolorimeters 2, and a monitor 3. The PC 1 includes a reference-value storage section 11 for storing the colorimetric values of the reference image 4, an evaluation-value storage section 12 for storing the colorimetric values of the image 5 to be evaluated, a color-evaluation-scale calculation section 13 for calculating color-evaluation scales from calorimetric values, an allowance-value storage section 15 for storing an allowance characteristic for each user, a determination section 14 for comparing the color reproduction index (CRI) calculated by the color-evaluation-scale calculation section 13 with a selected allowance to determine whether the color-reproduction precision reaches the allowance level, and a layer-display-data generation section 16 for generating data used for displaying in layers a plurality of color evaluation scales and an extent to which the color-reproduction precision reaches the allowance level.

The color-reproducibility evaluation apparatus stores in advance the allowance level of each user and the psychological and physical characteristic value both obtained in the foregoing procedure, in the allowance-value storage section 15, and also stores calorimetric values input from the spectrocolorimeters 2 in the reference-value storage section 11 and in the reference-value storage section 12. Reference values and evaluation values are sent to the color-evaluation-scale calculation section 13 to calculate color evaluation scales, and data to be displayed is generated by the layer-display-data generation section 16.

The color reproduction index calculated by the color-evaluation-scale calculation section 13 and the allowance value of a user, stored in the allowance-value storage section 16 are sent to the determination section 14 to determine whether the color-reproduction precision of the image to be evaluated reaches the allowance level. Display data indicating the result of determination is generated by the layer-display-data generation section 16.

Figure 11:
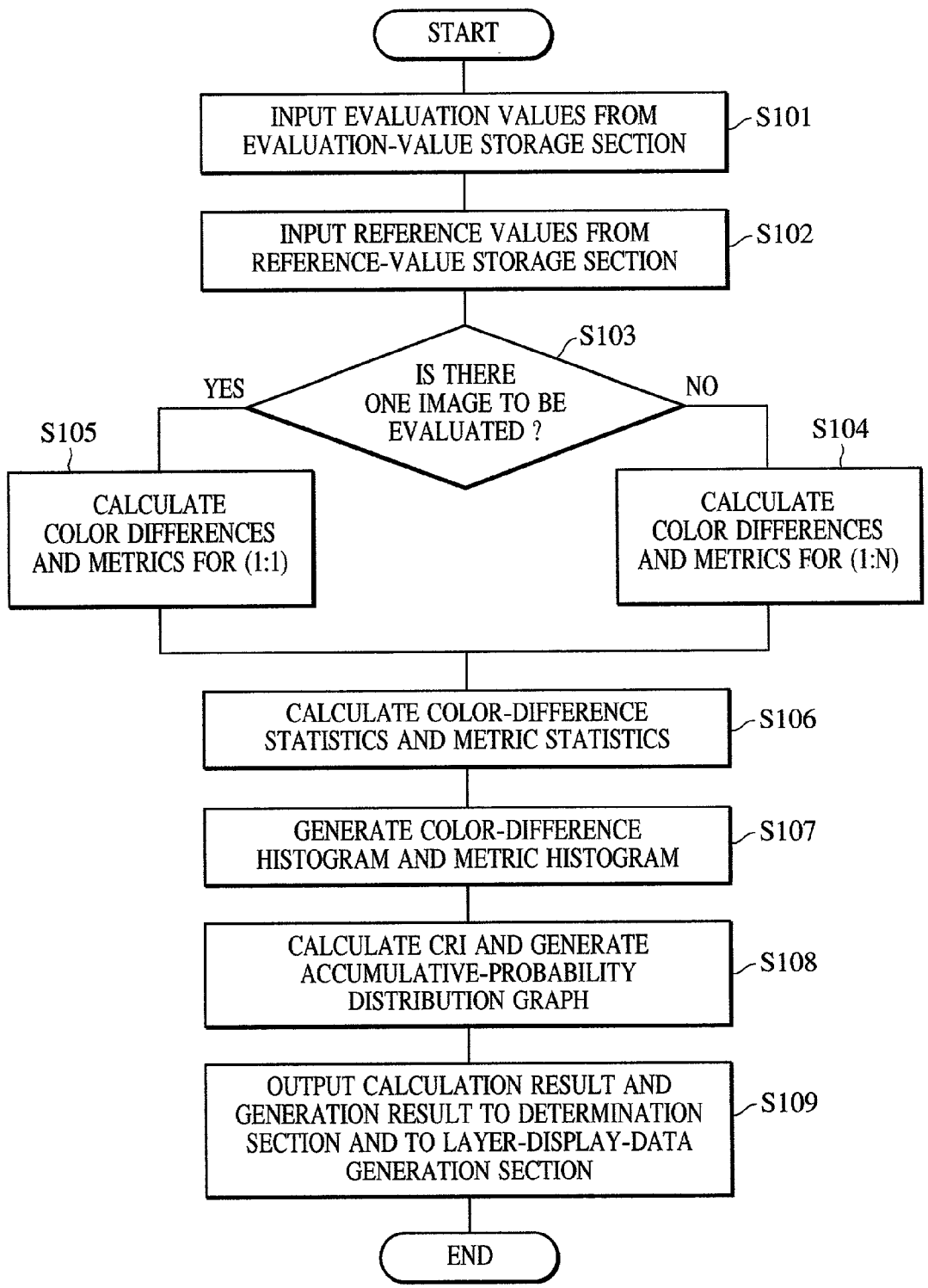
FIG. 11 is a flowchart of a procedure for calculating a color evaluation scale, executed by a color-evaluation-scale calculation section.

FIG. 11 is a flowchart of a procedure in which the color-evaluation-scale calculation section 13 calculates color evaluation scales to be used.

A reference value and a value to be evaluated are input from the reference-value storage section 11 and from the reference-value storage section 12 in S101 and S102. The color-evaluation-scale calculation section 13 determines in S103 whether one set of values to be evaluated or a plurality of sets of values to be evaluated were input to determine (if one image 5 or a plurality of images 5 are to be evaluated). When one image 5 is to be evaluated, the section 13 calculates color differences and metrics for colorimetric values of the reference image and the image to be evaluated in step S105. When a plurality of images 5 is to be evaluated, the section 13 calculates color differences and metrics for colorimetric values of the reference image and the N images to be evaluated in step S104.

Then, the section 13 calculates color-difference statistics and metric statistics in step S106. The section 13 generates a color-difference histogram and a metric histogram in step S107, and calculates a CRI and generates an accumulative-probability distribution graph in step S108. Then, the section 13 outputs the results of the calculation and generation to the determination section 14 and to the layer-display-data generation section 16 in step S109.

Figure 12:
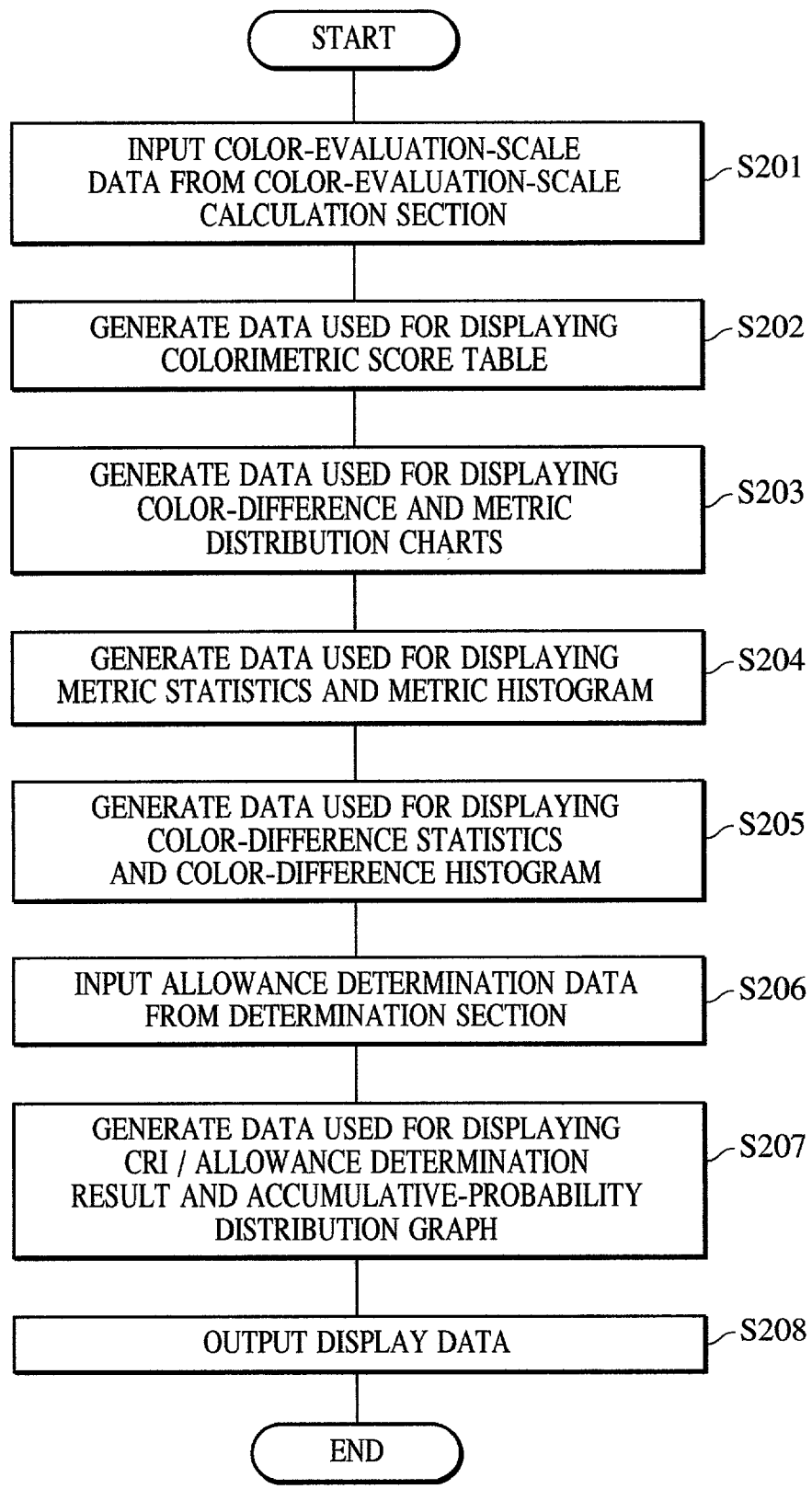
FIG. 12 is a flowchart of a procedure for generating display data, executed by a layer-display-data generation section.

FIG. 12 is a flowchart of a procedure in which the layer-display-data generation section 16 generates data to be displayed.

The layer-display-data generation section 16 receives the results of the calculation and generation for the color evaluation scales from the color-evaluation-scale calculation section 13 in step S201, and generates in step S202 data used for displaying a colorimetric score table by the use of the color differences and metrics calculated in step S104 or S105. Data to be displayed is arranged in a specified order (arrangement order, ascending order in precision, or descending order in precision). Then, the section 16 generates data used for displaying a color-difference distribution chart and a metric distribution chart in step S203.

In step S204, the section 16 generates data used for displaying the metric statistics and the metric histogram calculated and generated in steps S106 and S107, and in step S205, the section 16 generates data used for displaying the color-difference statistics and the color-difference histogram calculated and generated in steps S106 and S107.

Section 16 then receives the allowance determination data of a user from the determination section 14 in step S206, generates data used for displaying the CRI and the accumulative-probability distribution graph calculated and generated in step S108, and combines it with the allowance determination data in step S207.

The section 16 outputs generated display data in step S208 to the monitor 3 to display the color-evaluation scales in layers.

The allowance determination data obtained from the determination section 14 is for a user specified through an operation input section (not shown) of the PC 1. The determination section 14 may be configured such that users are classified into various layers (such as an age/generation layer, a gender layer, a birth/residence-area layer, an occupation layer, and an occupation-category layer), and one layer is specified to output the allowance determination data of the representative user of the layer from the determination section 14.

Figure 13:
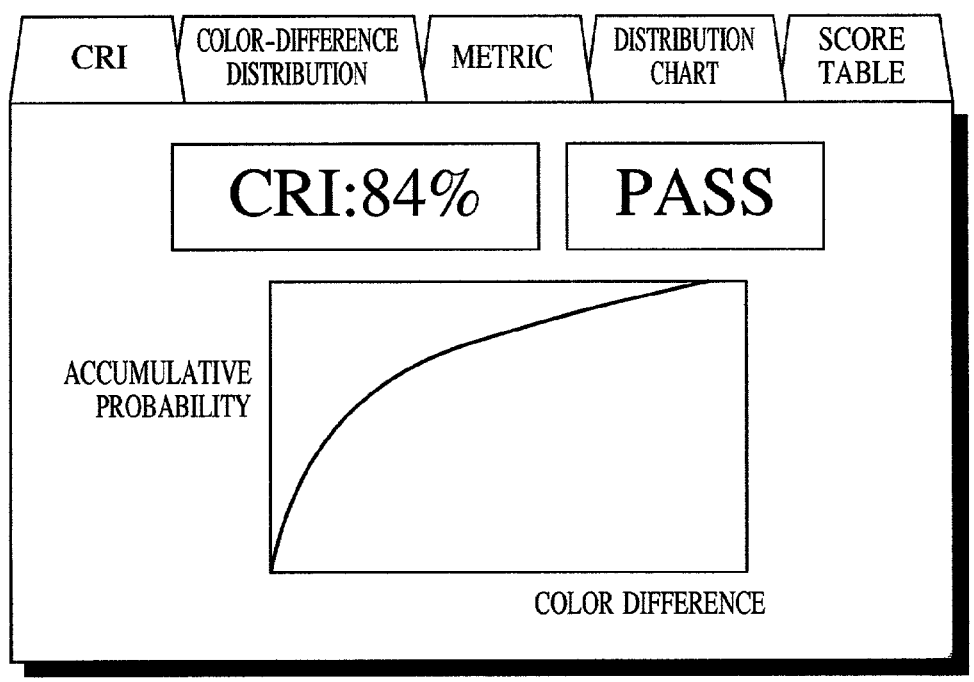
FIG. 13 is a view of a layer display of a plurality of color evaluation scales.
Figure 14A:
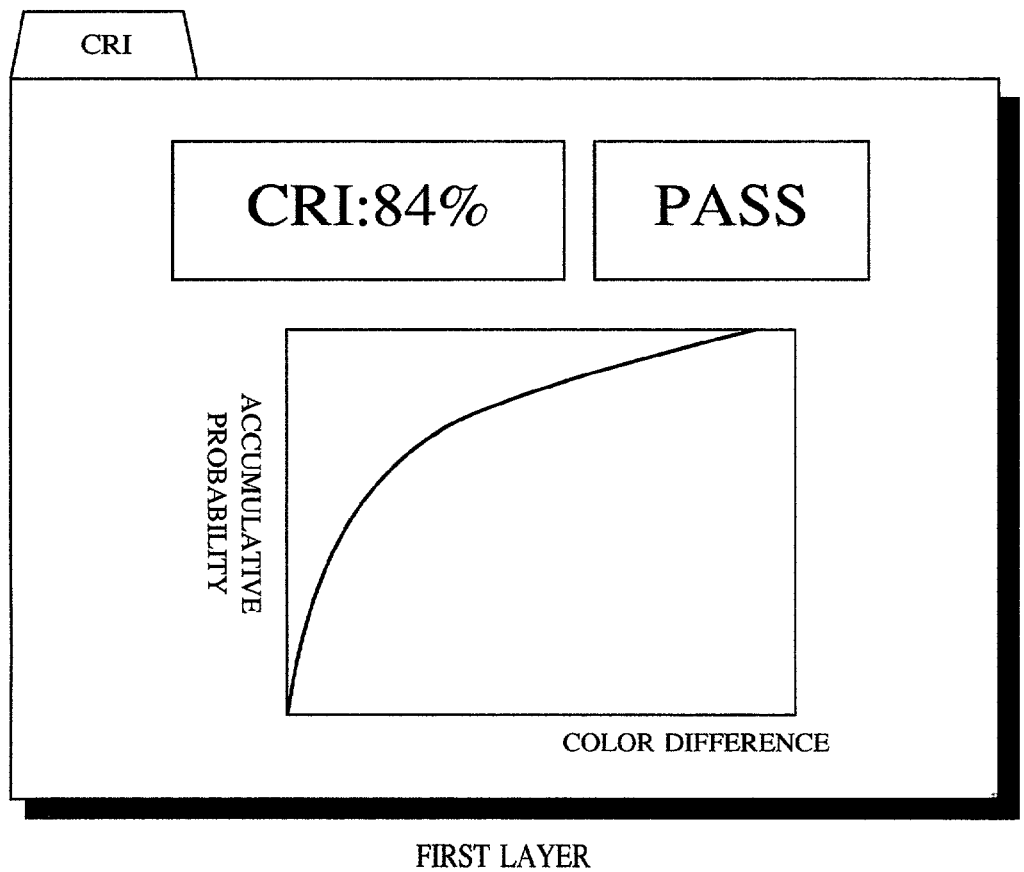
Figure 14B:
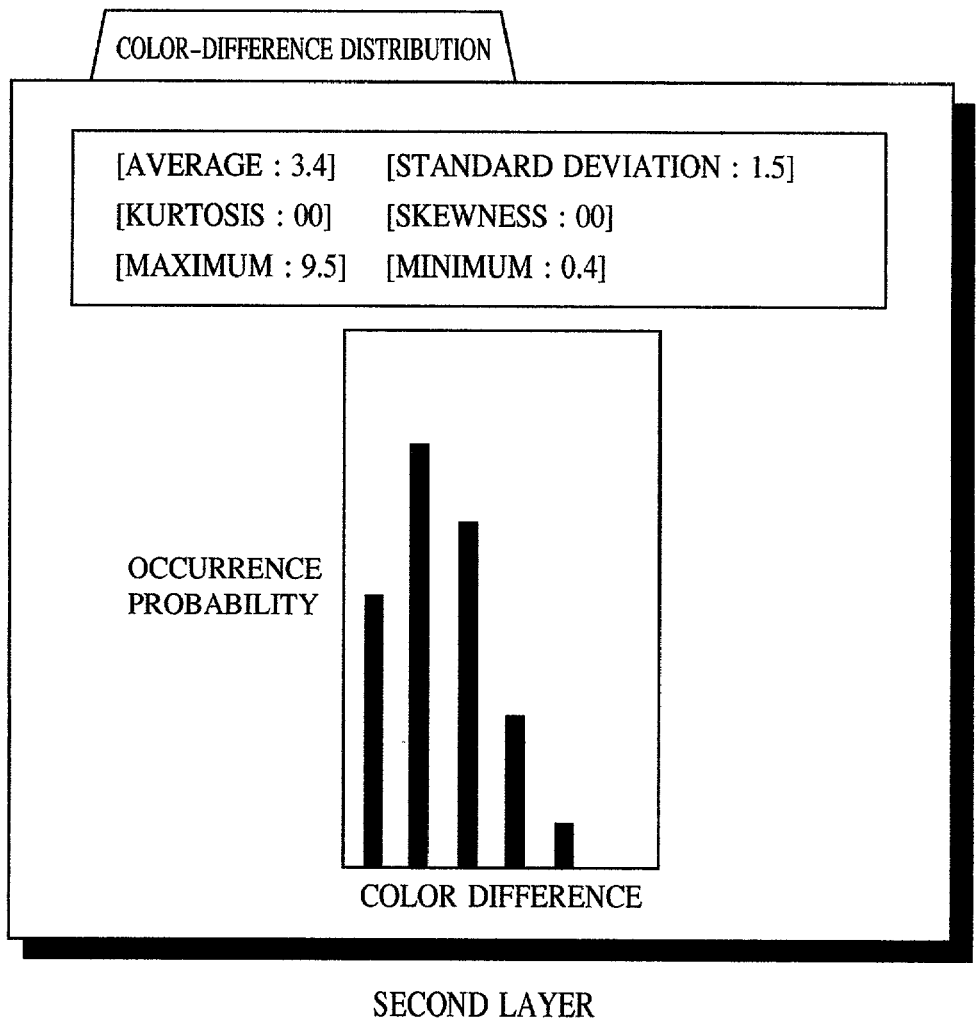
Figure 14C:
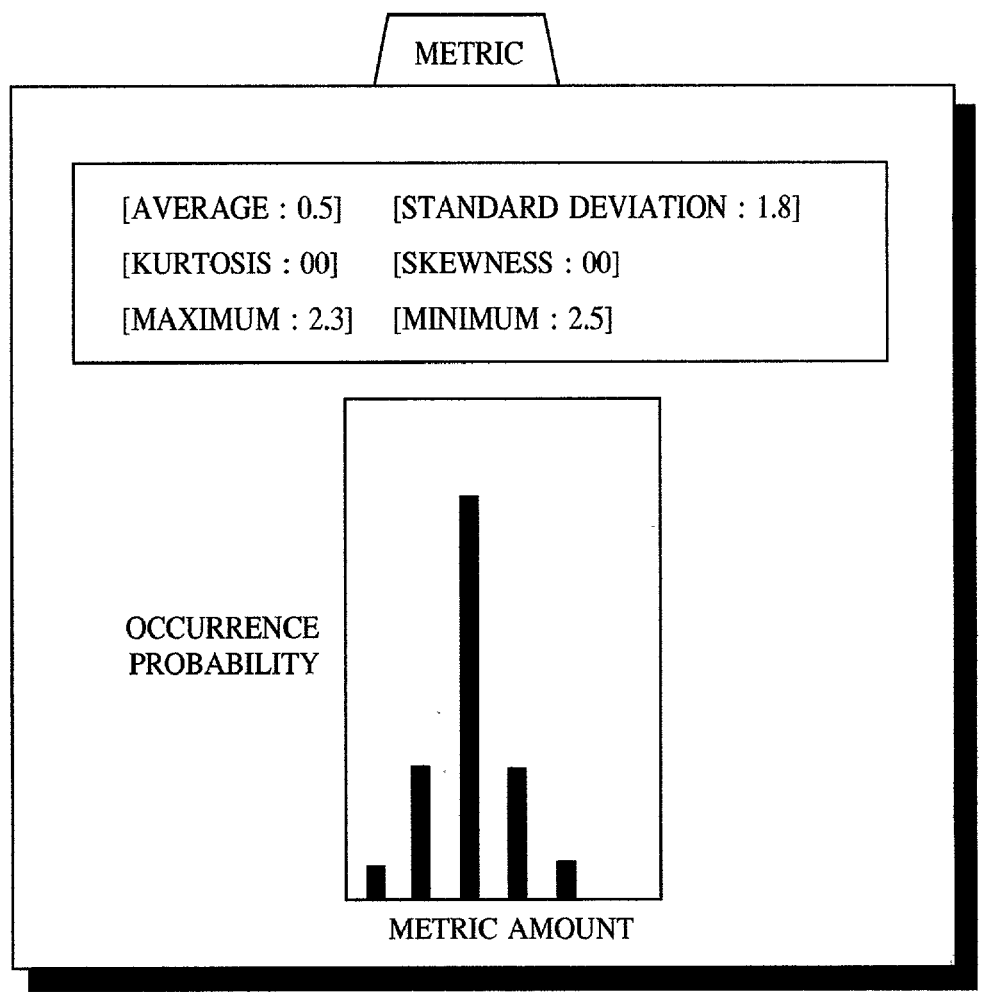
Figure 14D:
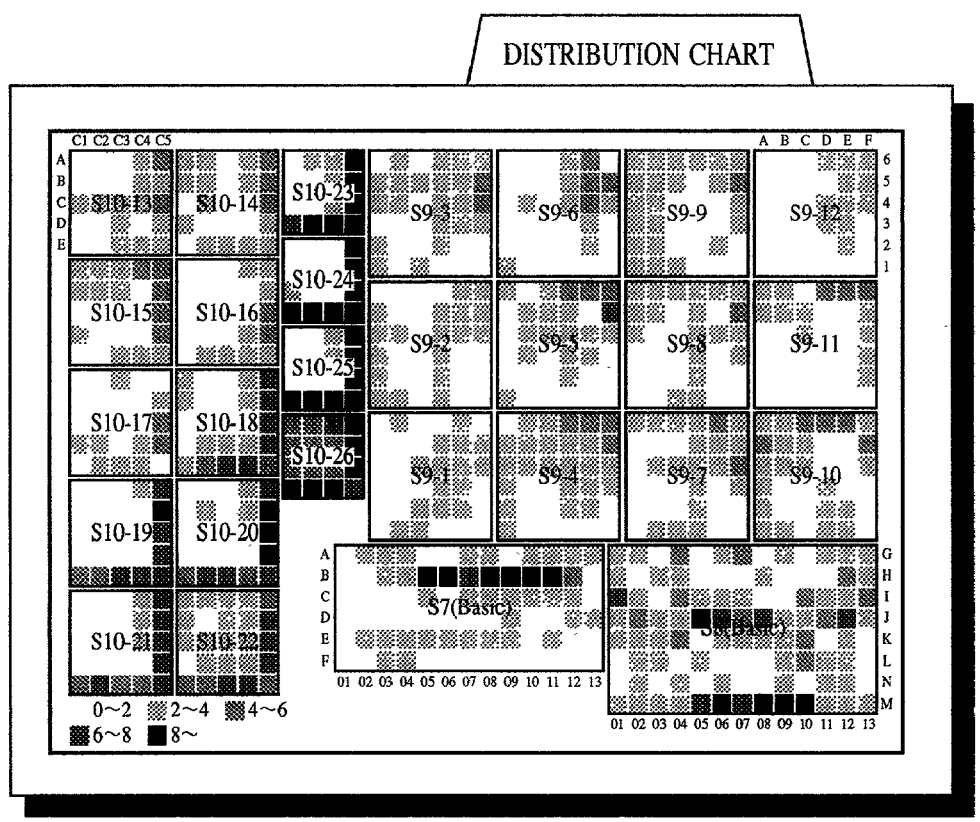

FIG. 13 is a view showing a layer display of a plurality of color-evaluation scales, and FIGS. 14A to 14E are views showing the layers of the plurality of color-evaluation scales.

The CRI and the accumulative-probability distribution graph are disposed in a first layer, the color-difference statistics and the color-difference histogram are disposed in a second layer, the metric statistics and the metric histogram are disposed in a third layer, the color-difference distribution chart and the metric distribution chart are disposed in a fourth layer, and the colorimetric score table is disposed in a fifth layer. Each layer can be displayed by selecting the corresponding tag, "CRI," "Color-difference distribution," "Metric," "Distribution chart," or "Score table," with a pointing device, such as a mouse.

These scales may be displayed such that all the layers shown in FIG. 14 are reduced in size and displayed on an initial screen, and when a layer is selected, the layer is expanded (to the normal size) and displayed.

According to the present embodiment, a color-evaluation scale having a high correlation with a psychological quantity can be predicted with a high precision, and a plurality of evaluation scales can be effectively displayed to collectively handle an overall color-reproduction precision to a color-reproduction precision for each evaluation color. Therefore, evaluation data for color reproducibility can be highly analyzed to optimize color-image control.

In addition, color reproducibility can be objectively predicted with a high precision, and the apparatus can be controlled in processes so as to reach the request level of each user. The apparatus for processing, displaying, and recording a color image having a higher-precision color reproducibility can be provided.

The color printers are taken as examples in the above-described embodiment. The color-reproducibility evaluation method and apparatus according to the present embodiment can be applied to display apparatuses such as a monitor. Color reproducibility between different media, such as a monitor display and a color-printer output, can also be handled. The present invention is not limited to the above-described embodiment. Within the scope and spirit of the present invention, various modifications are possible.

OTHER EMBODIMENTS

The present invention may be applied to a system formed of a plurality of units (such as a host computer, an interface unit, a reader, and a printer), or may be applied to an apparatus formed of one unit (such as a copying machine or a facsimile machine).

An object of the present invention is also achieved when a storage medium (recording medium) which records the program code of software implementing the functions of the above-described embodiment is sent to a system or an apparatus, and a computer (CPU or MPU) of the system or the apparatus reads and executes the program code stored in the storage medium. In this case, the program code itself read from the storage medium implements the functions of the above-described embodiment, and therefore, the storage medium which stores the program code is a part of the present invention. The present invention also includes a case in which an operating system (OS) working on the computer executes the whole or a part of actual processing according to the instructions of the program code, and the processing implements the functions of the above-described embodiment, in addition to a case in which the computer executes the read program code to implement the functions of the above-described embodiment.

Further, the present invention also includes a case in which the program code read from the storage medium is written into a memory provided for a function extension card inserted into the computer or for a function extension unit connected to the computer, a CPU provided for the function extension card or the function extension unit executes the whole or a part of actual processing according to the instructions of the program code, and the processing implements the functions of the above-described embodiment When the present invention is applied to the storage medium, the storage medium stores a program code corresponding to the above-described flowcharts.

As described above, overall color reproducibility can be accurately evaluated with a plurality of evaluation colors.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An evaluation apparatus for evaluating the color reproducibility of a device which processes a color image, comprising:

calculation means for calculating at least one of color differences and metrics from the colorimetric values of a reference image and the colorimetric values of an image to be evaluated, for a plurality of input evaluation colors;

computation means for computing a plurality of color-evaluation scales indicating a color-reproduction precision of the image to be evaluated, according to at least one of the calculated color differences and metrics;

generation means for generating display data used for displaying the plurality of color-evaluation scales; and display means for displaying, as the color-evaluation scales, at least two of a color reproduction index and an accumulative-probability distribution graph, a color-difference statistic and a color-difference histogram, a metric statistic and a metric histogram, a color-difference distribution chart and a metric distribution chart, and a colorimetric score table.

2. An evaluation apparatus according to claim 1, further comprising determination means for comparing an allowance area for each user obtained as a psychological and physical quantity from the correlation between a request level of the user and the plurality of color-evaluation scales, with the plurality of color-evaluation scales computed by said computation means to determine an extent to which color-reproduction precision reaches the allowance level of a specified user.

3. An evaluation method for evaluating the color reproducibility of a device which processes a color image, comprising the steps of:

calculating color differences and metrics from the colorimetric values of a reference image and the colorimetric values of an image to be evaluated, for a plurality of input evaluation colors;

computing a plurality of color-evaluation scales indicating a color-reproduction precision of the image to be evaluated, according to at least one of the calculated color differences and metrics;

generating display data used for displaying the plurality of color-evaluation scales; and displaying, as the color-evaluation scales, at least two of a color reproduction index and an accumulative-probability distribution graph, a color-difference statistic and a color-difference histogram, a metric statistic and a metric histogram, a color-difference distribution chart and a metric distribution chart, and a colorimetric score table.

4. A computer readable medium storing a computer program for evaluating the color reproducibility of a device which processes a color image, comprising:

code for calculating at least one of color differences and metrics from the colorimetric values of a reference image and the colorimetric values of an image to be evaluated, for a plurality of input evaluation colors;

code for computing a plurality of color-evaluation scales indicating a color-reproduction precision of the image to be evaluated, according to at least one of the calculated color differences and metrics;

code for generating display data used for displaying the plurality of color-evaluation scales; and code for displaying, as the color-evaluation scales, at least two of a color reproduction index and an accumulative-probability distribution graph, a color-difference statistic and a color-difference histogram, a metric statistic and a metric histogram, a color-difference distribution chart and a metric distribution chart, and a colorimetric score table.

* * * * *